3,518,039
PROCESS FOR DYEING AND PRINTING POLYM-
ERISATES AND MIXED POLYMERISATES OF
ACRYLONITRILE
Reinhard Mohr and Johann Ostermeier, Offenbach (Main),
Germany, assignors to Farbwerke Hoechst Aktienge-
sellschaft vormals Meister Lucius & Bruning, Frank-
furt am Main, Germany, a corporation of Germany
No Drawing. Filed June 21, 1966, Ser. No. 559,097
Claims priority, application Germany, June 25, 1965,
F 46,432
Int. Cl. C09b 27/00; D06p 3/02, 3/72
U.S. Cl. 8—41                               7 Claims

ABSTRACT OF THE DISCLOSURE

Articles of polyacrylonitrile dyed or printed with dye-stuffs of the formula:

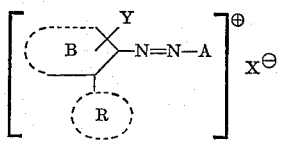

wherein B is a benzene or naphthalene radical, R is a cycloammonium radical, A is the radical of a coupling component, X⁻ is an anion and Y is hydrogen, chlorine, lower alkyl, lower alkoxy, —NH—CO—CH₃, —NO₂, —COOH₃, —CONH₂, —CON(CH₃)₂, —SO₂C₆H₅, —SO₂NH₂ or —SO₂N(CH₃)₂.

─────────────

The present invention provides dyed or printed shaped articles made of polyacrylonitrile which contains at least 35% of acrylonitrile, and a process for preparing them.

It provides in particular dyed articles of polyacrylonitrile containing at least 35% of acrylonitrile, which are dyed or printed with dyestuffs of the following general Formula I

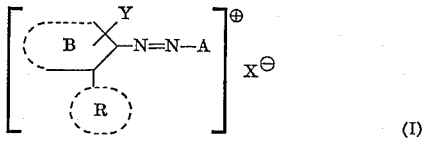    (I)

wherein B represents a benzene or naphthalene radical, R stands for a cycloammonium radical, A represents the radical of a coupling component, X⁻ represents an anion and Y stands for hydrogen or chlorine or the radicals lower alkyl, lower alkoxy, —NH—CO—CH₃, —NO₂, —COOCH₃, —CONH₂, —CON(CH₃)₂, —SO₂C₆H₅, —SO₂NH₂, —SO₂N(CH₃)₂.

The dyestuffs correspond in particular to the following general Formulae II and III

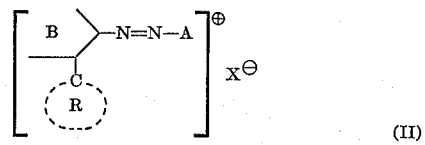    (II)

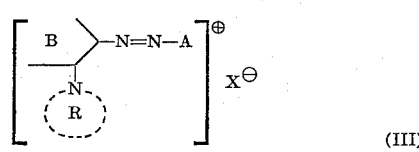    (III)

wherein A, B and R have the meanings given above. In the Formulae II–III B represents a benzene or naphthalene radical, which may contain further substituents which do not impart solubility in water, for example halogen atoms, alkyl, alkoxy, acylamino, nitro, carboxylic acid ester, carboxylic acid amide, alkylsulfonyl, arylsulfonyl, sulfonic acid ester or sulfonic acid amide groups, R stands for a 5- or 6-membered cycloammonium radical, the cycloammonium radical being a hetero cycle, which contains a quaternary nitrogen atom. The cycloammonium radical may contain further hetero atoms, for example further nitrogen atoms, oxygen or sulfur atoms and belong for example to the pyridine, pyrazole, imidazole, triazole, tetrazole, oxazole, thiazole, oxdiazole, thiodiazole, pyrimidine or triazine series and contain, if necessary, annulated benzene or naphthalene radicals. In the Formulae I–III A represents the radical of an aromatic or heterocyclic coupling component coupling in o- or p-position to a phenolic or enolic hydroxy group or a primary, secondary or tertiary amino group. The dyestuffs used according to the present invention contain as anion X⁻ preferably the radical of a strong acid, for example of sulfuric acid or the semiesters thereof, an arylsulfonic acid or a hydrohalic acid. X⁻ may also represent the anion of another acid, for example phosphoric acid, acetic acid, oxalic acid, lactic acid or tartaric acid. Moreover, it is possible to use the dyestuffs in the form of complex salts with zinc or cadmium halides.

The dyestuffs used according to the present process can be prepared by various methods, for example by condensation of o-amino-phenyl or o-aminonaphthyl-heterocyclene with nitroso compounds, such for example, as p-nitrosophenols, p-nitrosonaphthols or p-nitrosodi-alkylanilines, or by coupling of the diazotised o-amino-phenyl or o-aminonaphthylheterocyclene with the corresponding coupling components and subsequent treatment with quaternating agents, such for example, as alkyl or aralkyl halides, alkyl esters of sulfuric acid or alkyl or aryl esters of organic sulfonic acids. Appropriate quaternating agents are for example methyl chloride, methyl bromide, or methyl iodide, ethyl bromide, or ethyl iodide, propyl bromide or propyl iodide, benzyl chloride or benzyl bromide, dimethyl sulfate, diethyl sulfate, benzene sulfonic acid methyl ester or p-toluene sulfonic acid ethyl-, propyl, or butylester. It is advantageous to effect the quaternation in an indifferent organic solvent, for example in a hydrocarbon, chlorohydrocarbon or nitrohydrocarbon, such, for example, as benzene, toluene, xylene, chlorobenzene or nitrobenzene, in an acid amide or acid anhydride, such, for example, as dimethylformamide, or acetic acid anhydride, in dimethylsulfoxide or in a ketone, such, for example, as methylethylketone. It is also possible to use instead of an organic solvent an excess of the quaternating agent. The quaternation is effected at an elevated temperature, if required, under pressure. The most favorable conditions can easily be found out by a preliminary test. The dyestuffs used according to the present process can also be obtained by coupling the quaternated o-aminophenyl- or o-amino-naphthylheterocyclene with the corresponding coupling components.

Appropriate o-aminophenyl- or o-aminonaphthylheterocyclene are for example 2-(2'-aminophenyl)-benzothiazoles, 2 - (2' - aminophenyl)-benzimidazoles, 2-(2'-aminophenyl)- or 2 - (2' - aminonaphthyl-1')-benzotriazoles, 2-(2'-aminophenyl)-benzoxazoles, 2 - (2' - aminophenyl)-1,3,4-oxdiazoles, 5 - (2' - aminophenyl) - 1,2,4-oxdiazoles, 3-(2'-aminophenyl)-1,2,4-oxdiazoles, 2-(2'-aminophenyl) - 1,3,4 - thiodiazoles, 2-(2'-aminophenyl)-1,3,4-triazoles, 1-(2'-aminophenyl)-1,2,3-triazoles, 1-(2'-aminophenyl)-pyrazoles, 1-(2' - aminophenyl)-tetrazoles or 5-(2'-aminophenyl)-tetrazoles.

Aromatic or heterocyclic hydroxy compounds are for example: phenol, the derivatives of phenol substituted in 4-position, for example p-kresole, p-chlorophenol, 4-hydroxy-1,2-xylene, 4 - hydroxy-acetophenone and hydroquinone-monomethylether, the derivatives of α-naphthol substituted in 4-position, for example 4-chloro-1-naphthol, 4-methoxy-1-naphthol and 4-benzoyl - 1 - naphthol, β-naphthol and derivatives thereof, for example 6-bromo-2-naphthol, 7 - hydroxy-2-methoxynaphthalene, 1-benzoylamino-7-naphthol and 4-benzene-azo-1-amino-7-naphthol, as well as 6-hydroxyquinoline, 8-hydroxyquinoline, 3-hydroxyquinoline, 3-hydroxydiphenylamine, 2 - hydroxycarbazole, 3-hydroxydiphenylene-oxide and 1-aryl-3-methyl-5-pyrazolone. In addition to these monohydroxy compounds there are also used as coupling components polyhydroxy compounds of the aromatic or heterocyclic series coupling in o-position to the hydroxy groups, for example resorcinol, benzoylresorcinol, terephthaloylbisresorcinol, 2,6-dihydroxynaphthalene, 2,4 - dihydroxyquinoline and 3,6-dihydroxydiphenylene oxide. Appropriate compounds are also alkyl or arylamides or aromatic or heterocyclic o-hydroxycarboxylic acids or of acylacetic acids, for example alkyl or arylamides of 2,3-hydroxynaphthoic acids, 2-hydroxycarbazole - 3 - carboxylic acids, 3-hydroxydiphenylene-oxide-2-carboxylic acids, of acetoacetic acids or of benzoylacetic acids.

As primary amines to be used as coupling components there are mentioned for example aniline, toluidines, xylidines, anisidines, phenylene-diamines, toluylenediamines, aminokresole ethers, alkoxyanilines, chloranilines, 3-acylaminoanilines, dialkoxyanilines, naphthylamines, as well as heterocyclic amines, for example 5-aminopyrazoles, 7-aminoindazoles or 8-aminoquinolines.

Secondary amines are compounds of the formula A —NH— alkyl and tertiary amines are compounds of the formula A —N— (alkyl)$_2$, A representing a benzene or naphthalene radical which may carry, if desired, halogen atoms, alkyl, alkoxy, carboxylic acid ester, cyano, alkylsulfonyl or acylamino groups, Alk representing a low molecular alkyl radical, for example a methyl, ethyl, propyl or butyl radical which may carry, if desired, further substituents, for example fluorine atoms, chlorine atoms, dialkylamino, hydroxy, cyano, phenyl, alkoxy or phenoxy groups. The alkyl groups of the tertiary amines may form with each other or together with an oxygen or nitrogen atom hetero cycles, for example the piperidine, morpholine or piperazine rings. Appropriate tertiary amines are also N-alkyl-diarylamines, for example N-alkyldiphenylamines.

The azo dyestuffs used according to the present process can be dyed in a bath of a pH-range from 2 to 7. It is advantageous to dye in a bath of a pH from 4–5, by adding to the dyeing bath at the beginning either the necessary acid, for example acetic acid, formic acid, tartaric acid, sulfuric acid, phosphoric acid, or salts having acid reaction, or by adding to the dyeing bath agents which produce acids during the dyeing process, for example ammonium salts or water-soluble esters of organic acids. The fixation of the dyestuffs is carried out either in open devices at 70° to 100° C. or in closed vessels under pressure at temperatures from 115° to 125° C. The dyestuffs used according to the present process have a good affinity for shaped articles, for example for fibres, foils, threads or strips made of polyacrylonitrile or of mixed polymerisates containing other vinyl compounds, for example vinylidene chloride, vinyl chloride, vinylidene cyanide, methatrylatene, methylvinylpyridine, vinylacetate, N-vinylpyrrolidone, styrene sulfonic acids or vinyl alcohol containing at least 35% of acrylonitrile, and they produce uniform dyeings of fastness properties. The dyeing baths are almost completely exhausted under the usual dyeing conditions within normal dyeing periods.

Compared with known azo dyestuffs containing cycloammonium groups wherein the azo group is linked to the cycloammonium group by a p-phenyl radical, the dyestuffs used according to the present process are less sensitive to acids, a fact which enables their use in a more extended pH-range.

The following examples illustrate the invention but they are not intended to limit it thereto.

EXAMPLE 1

I gram of the dyestuff of the formula:

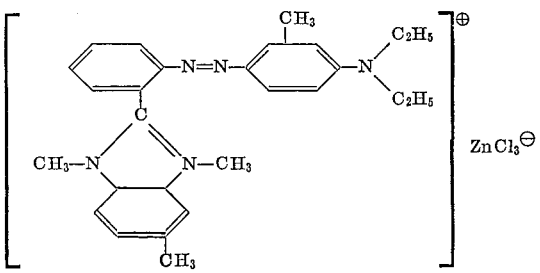

is stirred with 2 grams of acetic acid of 50% and dissolved in 5 litres of water. 100 grams of a washed yarn made of polyacrylonitrile fibre is introduced into the dyeing bath at 60° C., the temperature is gradually raised to 100° C. and the whole is dyed for one hour at boiling temperature. The batch is then gradually cooled to approximately 70° C., before rinsing and drying. A clear reddish orange dyeing is obtained which has excellent fastness to light and wetting processes.

EXAMPLE 2

20 grams of the dyestuff of the formula:

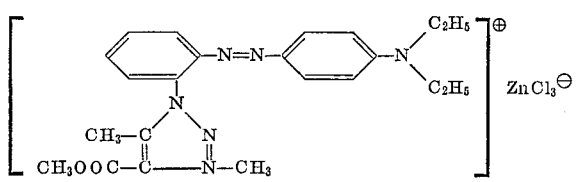

are dissolved hot with 50 grams of β,β'-dioxydiethylsulfide, 30 grams of cyclohexanol, 50 grams of acetic acid of 50%, and 400 grams of water and stirred into 450 grams of a crystal gum thickener 1:2. This printing dyestuff is printed on a tissue made of polyacrylonitrile staple fibres. The printing obtained is dried, steamed for 30 minutes at 0.7 gauge pressure, saponified at 50° C. with 1 gram of a condensation product of oleic acid and methyl-taurine and finished in the usual manner. An orange printing of excellent fastness properties is obtained.

EXAMPLE 3

5 grams of the dyestuff of the formula

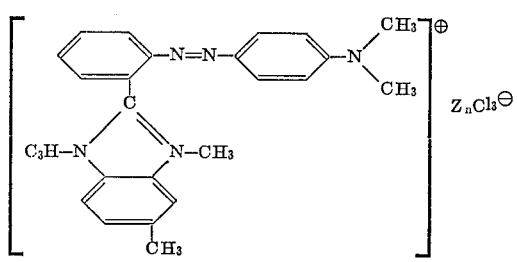

are stirred with 15 cc. of acetic acid of 50% and dissolved with 300 cc. of hot water. This stock solution is filled into a dyeing apparatus which contains 6 litres of water and 5 grams of sodium acetate. Subsequently 500 grams of a yarn made of polyacrylonitrile staple fibres on a cross-wound bobbin are introduced into the above apparatus and dyed while simultaneously changing the liquor circulation. The temperature is carefully raised to 106–108° C., particularly when exceeding 85° C., and maintained within this range for 45 minutes. After that period the dyeing bath is clearly exhausted, and after cooling to 70° C. the dyeing is finished in the usual manner. A clear yellowish orange dyeing of excellent fastness properties is obtained.

EXAMPLE 4

4 grams of the dyestuff of the formula

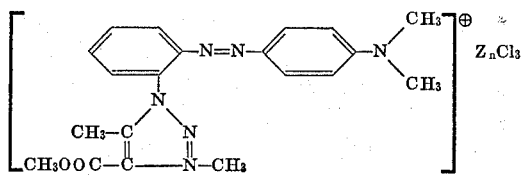

are stirred with 16 grams of sulfuric acid of 50% and dissolved in 200 cc. of hot water. This stock solution is filled into a yarn dyeing apparatus having a two-branched suspender, which contains 20 litres of water, 40 grams of crystallised sodium sulfate and 2 grams of a reaction product of 30 mols of ethylene oxide and 1 mol of nonyl phenol. 400 grams of yarn made of polyacrylonitrile stample fibres are introduced at 50° C., the whole is gradually heated and dyed for 90 minutes at boiling temperature. After gradually cooling to approximately 70° C. the whole is rinsed and dried. A clear yellowish orange dyeing of good fastness properties is obtained.

EXAMPLE 5

3 grams of the dyestuff of the formula

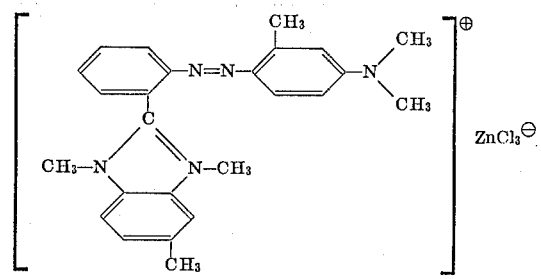

are dissolved with 10 grams of formic acid of 85% and 300 cc. of water and introduced into a winch beck which contains 50 litres of water and 2 grams of a reaction product of 30 mols of ethylene oxide and 1 mol of nonyl phenol. 1 kilogram of the mixed tissue made of polyacrylonitrile staple fibres and 50% of wool are dyed, at first at 50° C., the temperature is then gradually raised and finally the tissue is treated for 90 minutes at boiling temperature. Subsequently the whole is gradually cooled to approximately 70° C. and rinsed. On the polyacrylonitrile part an orange dyeing is obtained, while the wool part is completely resisted.

The following table lists further dyestuffs used according to the present invention as well as the shades of dyeings produced on polyacrylonitrile:

| Formula | Shade |
|---|---|
|  | Orange. |
|  | Do. |
|  | Golden yellow. |
|  | Orange. |
|  | Reddish orange. |

| Formula | Shade |
|---|---|
| 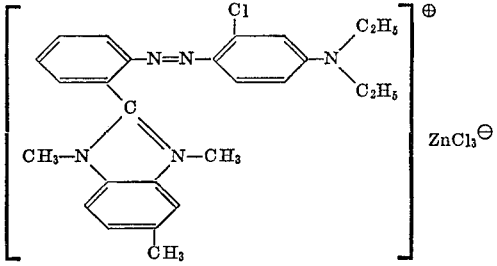 | Orange. |
| 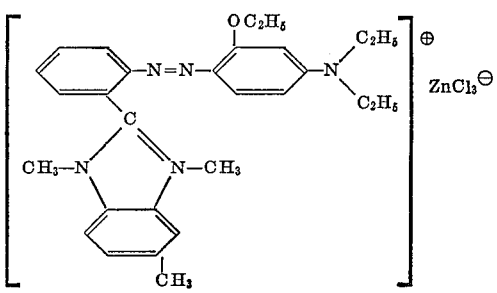 | Reddish orange. |
| 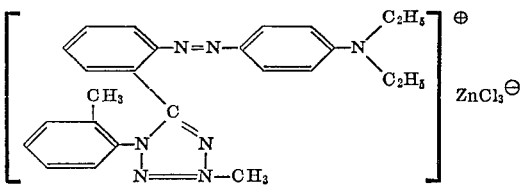 | Do. |
| 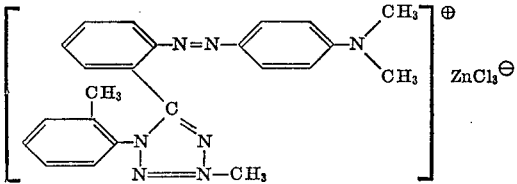 | Do. |
| 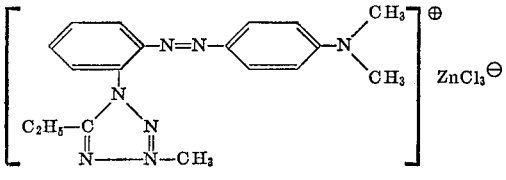 | Orange. |
| 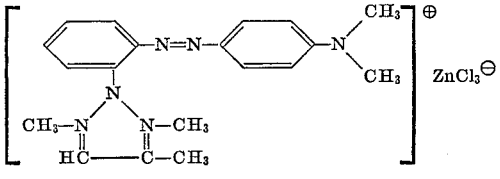 | Do. |
| 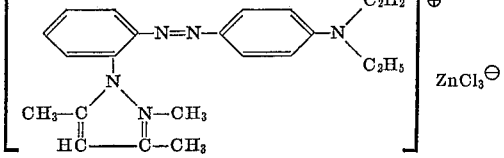 | Do. |

| Formula | Shade |
|---|---|
| 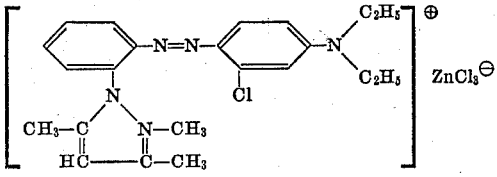 | Orange |
| 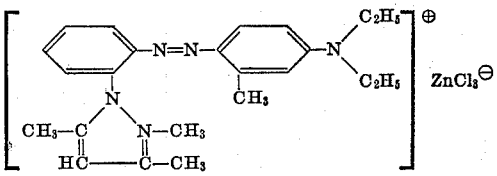 | Do. |
| 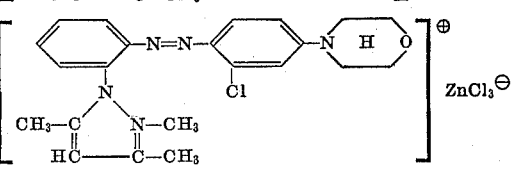 | Do. |
| 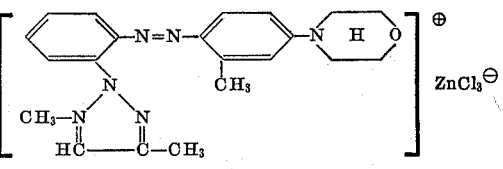 | Do. |
| 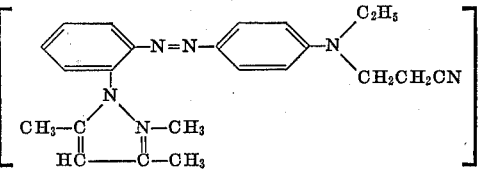 | Do. |
| 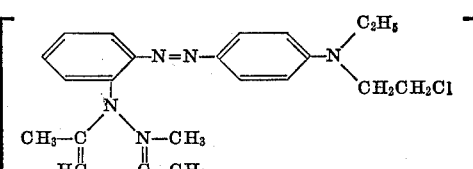 | Do. |
| 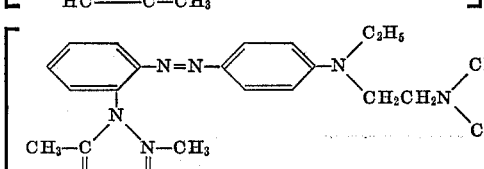 | Do. |
| 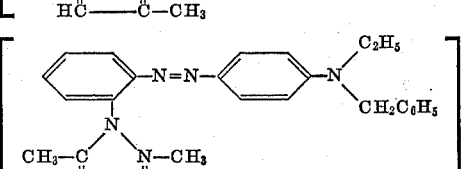 | Do. |
| 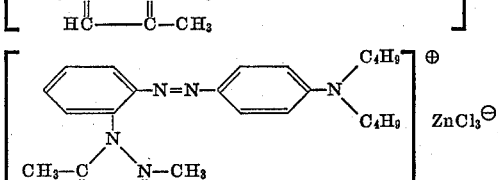 | Do. |
| 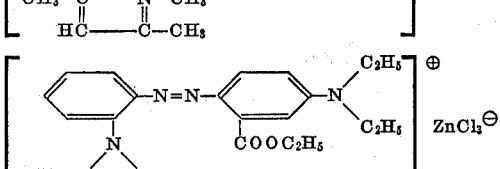 | Do. |

| Formula | Shade |
|---|---|
| 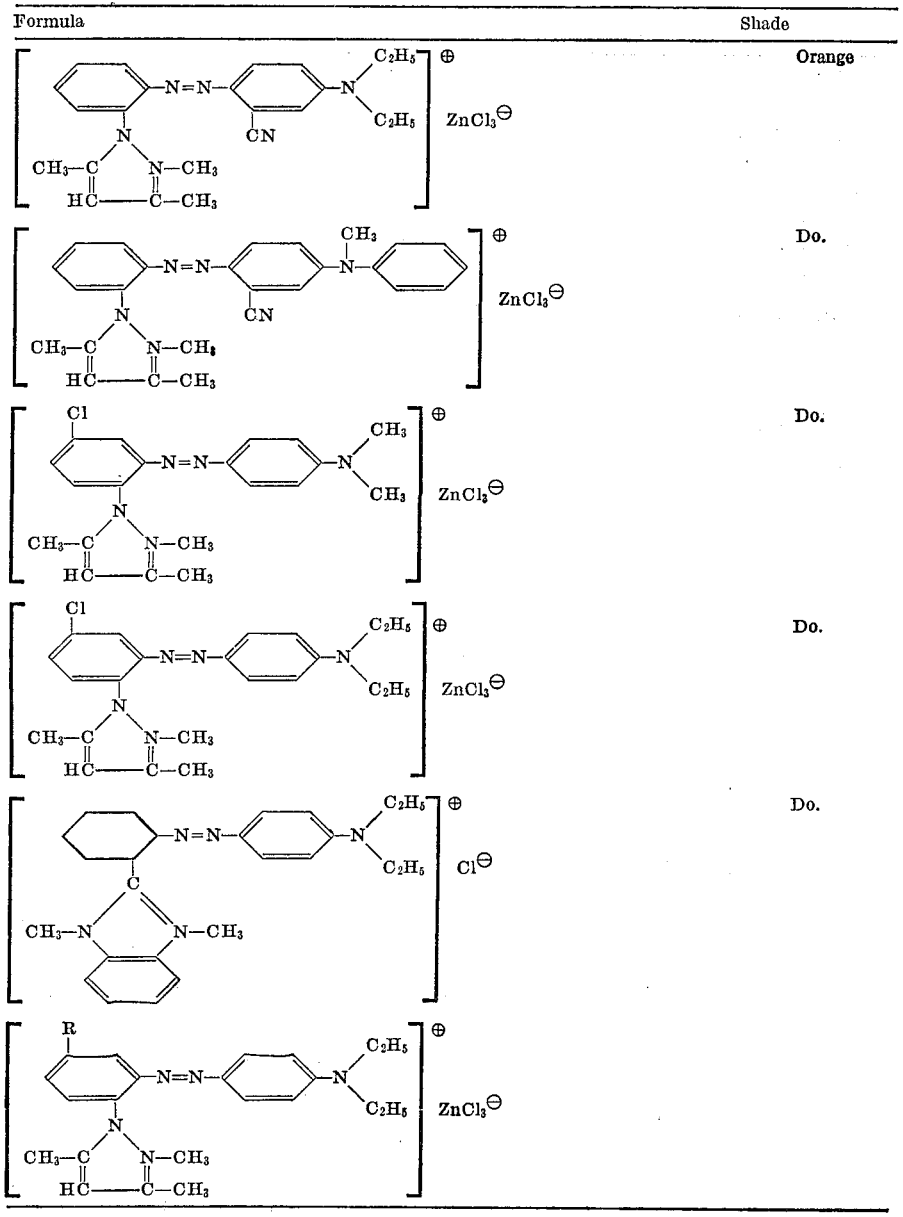 | Orange |
| | Do. |
| | Do. |
| | Do. |
| | Do. |
| | Do. |

R=—CH₃, —OCH₃, —NH—CO—CH₃, —NO₂,
—COOCH₃—CONH₂, —CON(CH₃)₂, —SO₂CH₃,
—SO₂C₆H₅, —SO₂NH₂, —SO₂N(CH₃)₂.

The dyestuffs corresponding to the foregoing general formula yield on polyacrylonitrile fibres orange dyeings.

We claim:

1. Shaped articles consisting of a polyacrylonitrile containing at least 35% of acrylonitrile, dyed or printed with a basic azo dyestuff, the cation of which having the formula

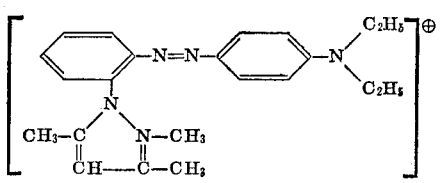

2. Shaped articles consisting of a polyacrylonitrile containing at least 35% of acrylonitrile, dyed or printed with a basic azo dyestuff, the cation of which having the formula

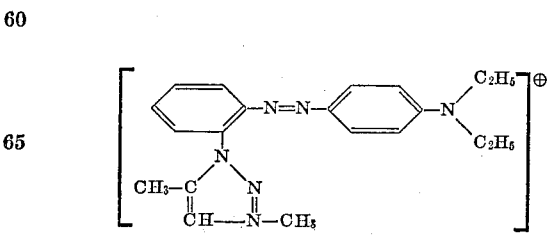

3. Shaped articles consisting of a polyacrylonitrile containing at least 35% of acrylonitrile, dyed or printed with a basic azo dyestuff, the cation of which having the formula

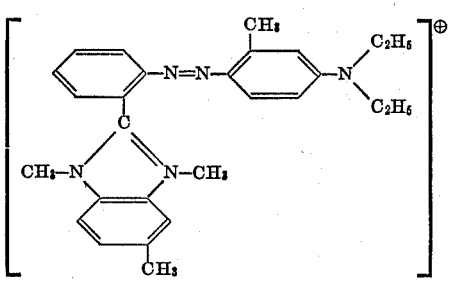

4. Shaped articles consisting of a polyacrylonitrile containing at least 35% of acrylonitrile, dyed or printed with a basic azo dyestuff, the cation of which having the formula

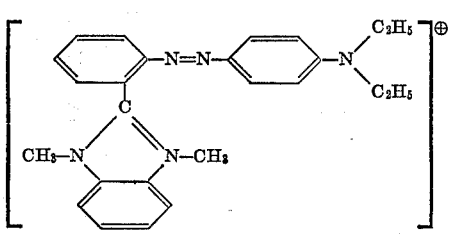

5. Shaped articles consisting of a polyacrylonitrile containing at least 35% of acrylonitrile, dyed or printed with a basic azo dyestuff, the cation of which having the formula

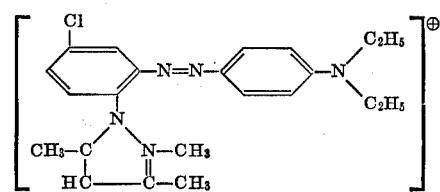

6. Shaped articles consisting of a polyacrylonitrile containing at least 35% of acrylonitrile, dyed or printed with a basic azo dyestuff, the cation of which has the formula:

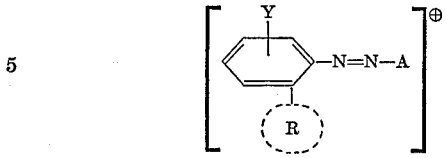

wherein R represents a cycloammonium grouping, A is the radical of a coupling component of the amine-substituted benzene or naphthalene series, and Y is hydrogen, chlorine, lower alkyl, lower-alkoxy, acetylamino, nitro, $-COOCH_3$, $CONH_2$, $-CON(CH_3)_2$, $-SO_2CH_3$, phenylsulfonyl, $SO_2NH_2$ and $-SO_2N(CH_3)_2$.

7. Shaped articles as claimed in claim 6, wherein the cation has the formula

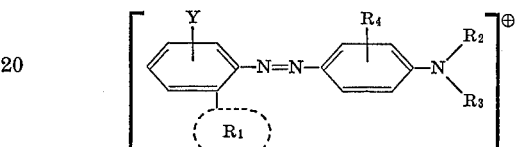

wherein $R_1$ represents an imidazolium, triazolium, pyrazolium or tetrazolium group, $R_2$ and $R_3$ are hydrogen, a lower alkyl group, benzyl or phenyl or when taken together with the nitrogen atom stand for morpholyl, $R_4$ is hydrogen, chlorine, lower alkyl, lower alkoxy, carbolower-alkoxy or cyano and Y is as defined in claim 6.

References Cited

UNITED STATES PATENTS

| 3,148,179 | 9/1964 | Carboni | 260—157 |
| 3,160,467 | 12/1964 | Sureau et al. | 8—41 |

FOREIGN PATENTS

| 787,582 | 12/1957 | Great Britain. |
| 1,102,439 | 2/1968 | Great Britain. |
| 1,391,676 | 2/1965 | France. |
| 1,484,099 | 6/1967 | France. |

NORMAN G. TORCHIN, Primary Examiner

J. E. CALLAGHAN, Assistant Examiner